US011892117B1

(12) United States Patent
Bertagna

(10) Patent No.: US 11,892,117 B1
(45) Date of Patent: Feb. 6, 2024

(54) METHOD FOR COATING A VALVE ASSEMBLY WITH A TWO LAYER ANTIMICROBIAL ANTICORROSION COATING

(71) Applicant: Watts Regulator Co., North Andover, MA (US)

(72) Inventor: Peter J. Bertagna, Moultonborough, NH (US)

(73) Assignee: Watts Regulator Co., North Andover, MA (US)

( * ) Notice: Subject to any disclaimer, the term of this patent is extended or adjusted under 35 U.S.C. 154(b) by 71 days.

(21) Appl. No.: 17/083,604

(22) Filed: Oct. 29, 2020

Related U.S. Application Data

(60) Provisional application No. 62/927,965, filed on Oct. 30, 2019.

(51) Int. Cl.
| | | |
|---|---|---|
| B05D 7/14 | (2006.01) | |
| B05D 3/02 | (2006.01) | |
| B05D 3/12 | (2006.01) | |
| F16L 58/08 | (2006.01) | |
| F16K 27/00 | (2006.01) | |
| B05D 7/00 | (2006.01) | |
| B05D 5/00 | (2006.01) | |
| B05D 1/04 | (2006.01) | |

(52) U.S. Cl.
CPC ............... *F16L 58/08* (2013.01); *B05D 1/04* (2013.01); *B05D 3/0218* (2013.01); *B05D 3/0254* (2013.01); *B05D 3/12* (2013.01); *B05D 5/00* (2013.01); *B05D 7/14* (2013.01); *B05D 7/542* (2013.01); *F16K 27/00* (2013.01); *B05D 2202/10* (2013.01); *B05D 2202/15* (2013.01); *B05D 2320/00* (2013.01); *B05D 2401/32* (2013.01); *B05D 2508/00* (2013.01)

(58) Field of Classification Search
CPC ...... B05D 1/04; B05D 3/0218; B05D 3/0254; B05D 3/12; B05D 5/00; B05D 7/14; B05D 7/542; B05D 2202/10; B05D 2202/15; B05D 2320/00; B05D 2401/32; B05D 2508/00; F16L 58/08; F16K 27/00
See application file for complete search history.

(56) References Cited

U.S. PATENT DOCUMENTS

| | | |
|---|---|---|
| 3,097,118 A | 7/1963 | Leonard |
| 3,409,525 A | 11/1968 | Taylor, Jr. et al. |
| 5,196,055 A | 3/1993 | Lesney et al. |
| 7,192,624 B2 | 3/2007 | Shtikan et al. |
| 8,063,116 B2 * | 11/2011 | Trogolo ................. C09D 5/033 428/407 |
| 8,796,364 B2 * | 8/2014 | Benavides ................ C09C 1/04 524/436 |
| 2004/0109853 A1 * | 6/2004 | McDaniel ................ C09D 5/34 424/94.63 |
| 2005/0182140 A1 | 8/2005 | Payne |
| 2009/0042042 A1 * | 2/2009 | Yuki ........................ B05D 5/00 428/447 |
| 2009/0238811 A1 * | 9/2009 | McDaniel ................ A61L 2/00 424/94.2 |
| 2016/0340514 A1 | 11/2016 | Zhao et al. |
| 2018/0361429 A1 | 12/2018 | Comley et al. |

FOREIGN PATENT DOCUMENTS

| | | | |
|---|---|---|---|
| CN | 1693393 A | * | 11/2005 |
| CN | 103173073 A | * | 6/2013 |
| CN | 109868034 A | * | 6/2019 |
| WO | WO-9903598 A1 | * | 1/1999 ............. B05D 7/148 |

OTHER PUBLICATIONS

"Protective Interior Coatings for Waterworks Valves" by Val-Matic Valve and Manufacturing Corp. Retrieved from < https://web.archive.org/web/20180508125507/http://www.valmatic.com/pdfs/ProtectiveInteriorCoatingsWaterworksValves.pdf> on Jul. 14, 2022, 6 pages (Nov. 22, 2017). (Year: 2017).*
"Paint and Coatings: A Walk through A Typical Valve Distributor's Warehouse Will Yield A Contrasting View of Either Silver Or Black Products." Valve Magazine: The Official Magazine of The Valve Manufacturers Association of America. Retrieved from <https://www.valvemagazine.com/articles/paint-coatings>.*
On Jul. 14, 2022 (published Dec. 17, 2018). (Year: 2018).*
American Water Works Association Standard ANSI/AWWA C550-05: Protective Interior Coatings for Valves and Hydrants, 22 pages (2005). (Year: 2005).*
"Epoxy-Polyester Hybrids" in A Guide to Applying Powder Coatings: Your Secret Weapon to Create High-Quality Finishes and Happy Customers, retrieved from <https://web.archive.org/web/20180417091525/https://www.ifscoatings.com/content/assets/Uploads/PDF/Ebook-A-Guide-to-applying-powder-coatings.pdf>.*
On Jul. 14, 2022, pp. 3-4 (2018). (Year: 2018).*
Sherwin Williams, "Technical Information Powdura Epoxy Powder Coating", Nov. 24, 2019, (1 page).
Dr. Volker Börchel, "Modern epoxy powder coating for valves and fittings", Eadips Fgr Ductile Iron Pipe Systems 52, [undated], (pp. 28-32).
Sherwin Williams, "Technical Information Powdura Epoxy Powder Coating", Dec. 22, 2017, (1 page).
Resicoat, "Heavy Duty Corrosion Protection of Cast Iron Valves and Fittings", Feb. 2009, Issue 2, (pp. 1-4), Published in Germany.
Carlisle Fluid Technologies, "ABC's of Spray Finishing", Jun. 2017, (pp. 1-4).

(Continued)

*Primary Examiner* — William P Fletcher, III
(74) *Attorney, Agent, or Firm* — Harris Beach PLLC

(57) ABSTRACT

A method for coating a valve assembly including: providing a valve assembly including a metal susceptible to corrosion; cleaning an outside surface of the valve assembly; preparing a zinc primer by adding an anti-microbial agent to provide an anti-microbial zinc primer; applying a first layer of the anti-microbial zinc primer to the outside surface of the valve assembly; and applying a second layer over the first layer, the second layer including a topcoat for a two-layer coat; and curing the two-layer coat by heating the valve assembly. A valve assembly with protection layers including anticorrosion and antimicrobial protection is also described.

19 Claims, 3 Drawing Sheets

(56) References Cited

OTHER PUBLICATIONS

Sherwin Williams, "Technical Information Powdura Hybrid Powder Coating—Product Description: LP4703G0 (HLS8-V0001) Watts Banner Blue", Apr. 13, 2018.
Sherwin Williams, "Technical Information Powdura Hybrid Powder Coating—Product Description: PHA80043 (HAS8-V0001) Gray Hybrid", Apr. 13, 2018.
Emerson Automation Solutions, "Corrosion Protection for Fisher Valves", Sep. 2017, (pp. 1-12).
3M, "3M Scotchkote Infrastructure Protection Products", 2013, (pp. 1-16).
Val-Matic Valve & Mfg. Corp, "Specify Val-Matic's Zinc-Rich Coating System for your buried valves" [undated].
Ramesh, R., et al, "Hybrid siloxane epoxy coatings containing quaternary ammonium moieties", Journal of Applied Polymer Science, vol. 110, Issue 5, Sep. 8, 2008 (p. 308-3086).

\* cited by examiner

METHOD FOR COATING A VALVE ASSEMBLY WITH A TWO LAYER ANTIMICROBIAL ANTICORROSION COATING

CROSS-REFERENCE TO RELATED APPLICATIONS

This application claims priority to and the benefit of U.S. provisional patent application Ser. No. 62/927,965, SYSTEM AND METHOD FOR COATING A VALVE ASSEMBLY WITH A TWO LAYER ANTIMICROBIAL ANTICORROSION COATING, filed Oct. 30, 2019, which application is incorporated herein by reference in its entirety.

FIELD OF THE APPLICATION

The application relates to industrial valve assemblies, particularly to valve assemblies with protective coatings.

BACKGROUND

Corrosion is the deterioration of a material due to chemical or electrochemical reaction resulting from exposure to severe weather, humidity, or to chemical products or other agents present in the environment in which that material is located. Corrosion is a process of a metal naturally returning to its oxide condition.

However, direct environmental factors are not the only root cause of corrosion. Corrosion can also be caused by a specific genera of bacteria which feed on nutrients and other elements found in water. Biological activities of the bacteria modify the local environment by acid production, which is corrosive to metals. This type of corrosion is known as microbial induced (MIC) corrosion. While corrosion still occurs over time without the influence of microbes, the activities of microbial organisms can accelerate the rate at which metals corrode. MIC can be especially dangerous to infrastructure. Unchecked, microbes can spread and multiply rapidly, quickly turning a small corrosion problem into a wide-ranging one.

SUMMARY

A method for coating a valve assembly includes: providing a valve assembly which includes a metal susceptible to corrosion; cleaning an outside surface of the valve assembly; preparing a zinc primer by adding an anti-microbial agent to provide an anti-microbial zinc primer; applying a first layer of the anti-microbial zinc primer to the outside surface of the valve assembly; and applying a second layer over the first layer, the second layer including a topcoat for a two-layer coat; and curing the two-layer coat by heating the valve assembly.

The step of providing can include providing an iron metal. The step of providing can include providing a steel metal.

The step of cleaning can include cleaning by shot blasting. The step of cleaning can include pre-heating the outside surface of the valve assembly to about 250° F.

The step of preparing the zinc primer by adding the anti-microbial agent can include anti-microbial particles of about 5-8 microns. The step of preparing the zinc primer by adding the anti-microbial agent can include preparing a primer gel.

The step of applying the first layer of the anti-microbial zinc primer to the outside surface of the valve assembly can include applying the first layer by an electrostatic process at about 75 kV.

The step of applying the second layer can include applying a hybrid polyester powder topcoat. The step of applying the second layer can include applying the second layer by an electrostatic process at about 75 kV. The step of applying the second layer can include heating the valve assembly to about 400° F.

A valve assembly has protection layers which include anticorrosion and antimicrobial protection. The valve assembly includes a metal which has a corrosion susceptible metallic outside surface. A first layer of a zinc primer and anti-microbial composition is deposited on the corrosion susceptible metallic outside surface. A second layer of a powder topcoat is deposited on the first layer.

The corrosion susceptible metallic outside surface can include an iron.

The first layer can include an anti-microbial agent including anti-microbial particles of about 5-8 microns.

The second layer can include a hybrid polyester topcoat.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
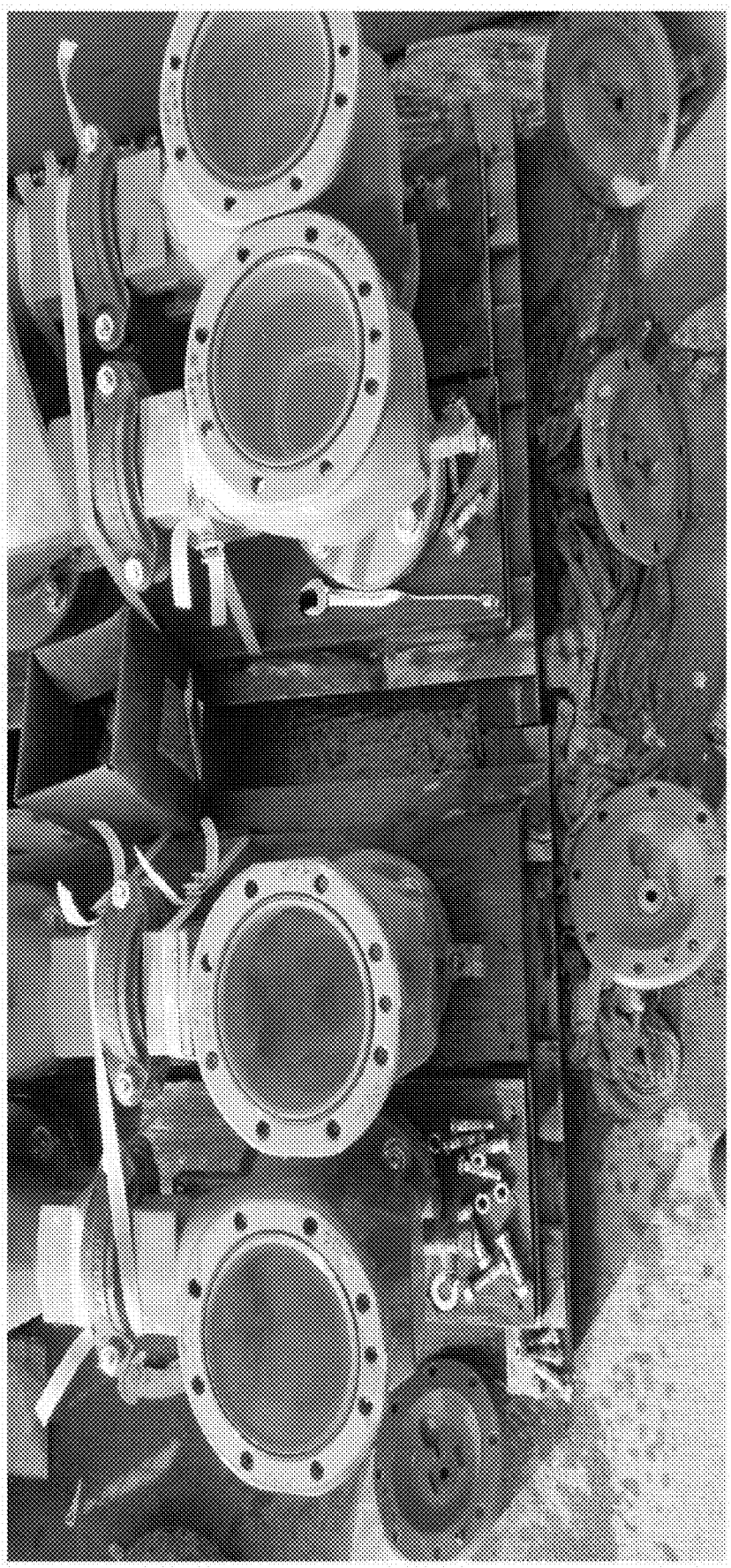
FIG. 1 is a drawing showing two test fixtures on the left which were untreated compared to two test fixtures on the right which were treated according to the Application.

As described hereinabove, corrosion is the deterioration of a material due to chemical or electrochemical reaction resulting from exposure to severe weather, humidity, or to chemical products or other agents present in the environment in which that material is located. Corrosion is a process of a metal naturally returning to its oxide condition.

However, direct environmental factors are not the only root cause of corrosion. Corrosion can also be caused by a specific genera of bacteria which feed on nutrients and other elements found in water. Biological activities of the bacteria modify the local environment by acid production, which is corrosive to metals. This type of corrosion is known as microbial induced (MIC) corrosion. While corrosion still occurs over time without the influence of microbes, the activities of microbial organisms can accelerate the rate at which metals corrode. MIC can be especially dangerous to infrastructure. Unchecked, microbes can spread and multiply rapidly, quickly turning a small corrosion problem into a wide-ranging one.

For example, water samples from the Las Vegas Valley Water District ("LVVWD") were analyzed by Silver State Laboratories for microbiologic induced corrosion. The test results indicated that high levels of acid-producing bacteria were present.

To address valve assembly corrosion problems such as the exemplary microbiologic induced corrosion identified at the LVVWD, we realized a two-layer coating system for industrial valves. The solution to advance corrosion protection involves the use of a two-layer system including a zinc rich epoxy primer with anti-microbial properties which is then over-coated by a protective epoxy-polyester coating.

The zinc rich primer layer not only provides some barrier protection to the metal substrate (typically steel), but also provides cathodic protection. When a cathodic cell is formed, the metal is protected at the expense of the zinc. Regular primers (non-zinc containing) can only act as a barrier between the metal and atmospheric moisture. In addition to providing superior resistance to corrosion, the zinc epoxy primer is tough and durable making it highly resistant to damage. The zinc epoxy primer also has superior edge coverage characteristics, important because the vulnerable edges are often where corrosion begins.

The two-coat valve assembly coating system according to the Application combines the cathodic protection afforded by the zinc with the additional protection of an outer coating. Should there be a breach in the outer coating's surface, this system works to prevent/reduce corrosion creep. Salt Spray testing, a common accelerated corrosion test used in the valve industry to measure the comparative corrosion resistance of materials, showed that a two-coat system according to the Application lasted significantly longer in testing, as compared to the single epoxy-polyester layer of the prior art.

An additional protection feature includes the incorporation of an antimicrobial agent into the zinc primer layer. Traditional polymers used to formulate powder coatings are susceptible to microbial degradation. Antimicrobial agents can be incorporated into the polymer matrix of the first primer layer to endow the coating with functionality that is effective in inhibiting microbe growth.

For example, in one solution according to the Application, an Microban™ antimicrobial protection has been infused into the EAS6-0M056 POWDURA™ Zinc Epoxy Primer to inhibit the growth of bacteria that may propagate the deterioration of the physical properties of the coating. Microban™ protection works to disrupt key bacterial cell functions to create a less inhabitable environment for microbes. The Microban™ antimicrobial protection provides protection for the expected life of the product and will not wear off, wash off, or leach from the coating. Moreover, as described hereinabove, should there be a cut/nick that penetrates through the outer coating's surface, the Microban™ additive in the primer layer will inhibit/slow the spread of microbial-induced corrosion.

This valve assembly three-pronged coating approach according to the Application provides an advanced active corrosion protection, especially when done in conjunction with a preparation of the valve assembly that includes cleaning by shot blasting, thus extending the lifecycle of the valve assembly asset.

Applicant performed field testing of valve assemblies comparing valve assemblies with a coating according to the prior art to valve assemblies coated using the two layer antimicrobial anticorrosion coating system and method according to the Application. FIG. 1 is a drawing showing two test fixtures on the left which were untreated compared to two test fixtures on the right which were treated according to the new system and method for coating a valve assembly with a two layer antimicrobial anticorrosion coating of the Application.

Figure 2A:
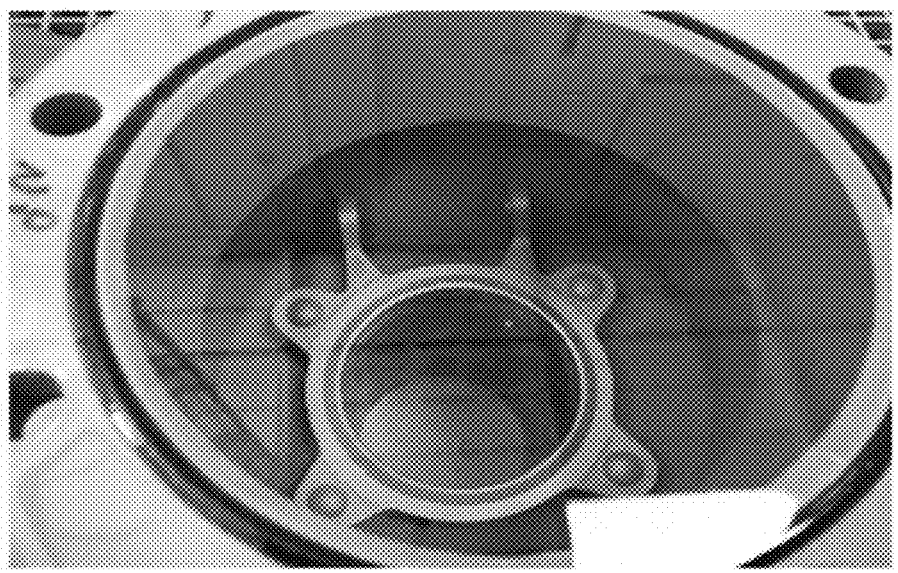
FIG. 2A shows the valve coated with a standard coating where MIC activity is present.
Figure 2B:
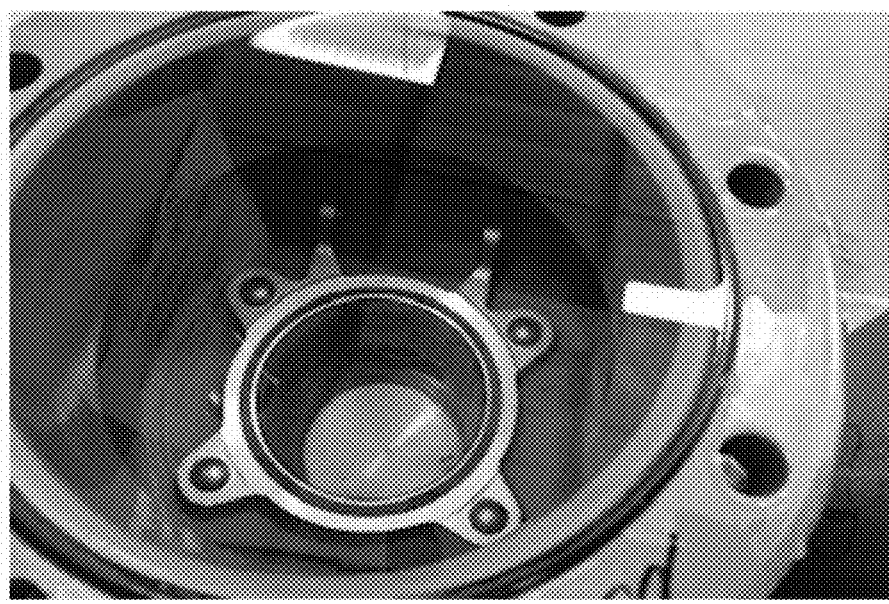
FIG. 2B shows a valve coated with the two layer antimicrobial anticorrosion coating of the Application where there is no MIC activity is present.

FIG. 2A and FIG. 2B respectively show a valve coated with a standard coating and a valve coated with the two layer antimicrobial anticorrosion coating of the Application. FIG. 2A shows the valve coated with a standard coating where MIC activity is present. FIG. 2B shows a valve coated with the two layer antimicrobial anticorrosion coating of the Application where no MIC activity is present.

Any suitable zinc coating can be used for use as modified according to the method and system according to the Application. One exemplary zinc coating suitable for use is Val-Matic's Zinc-Rich coating available from Val-Matic Valve & Mfg. Corp of Elmhurst, IL.

The following examples are offered by way of illustration and not by way of limitation. Exemplary Process:

Preparing and cleaning the metal substrate mechanically (shot blasting) to obtain a suitable profile to electrostatically apply and gel powder primer on a pre-heated surface (200-300 degrees F.).

Adding an anti-microbial agent measuring 5-8 Microns (5-8 one thousandths of a millimeter particle size) to a primer which includes zinc to also provide cathodic corrosion protection. According to one exemplary embodiment, the anti-microbial agent is an aqueous emulsion including a quaternary ammonium antimicrobial agent, an alkyl phenol, a styrenated phenol, and water.

In an electrostatic application, charging the primer to about 75 kV (e.g. 75+/−5 kilovolts) at about 25 μA (e.g. 25+/−5 micro amps).

Once the primer is gelled, encapsulating the primer with a hybrid polyester powder topcoat, which can also be applied by charging the primer to about 75 kV (e.g. 75+/−5 kilovolts) at about 25 μA (e.g. 25+/−5 micro amps), and curing at about 400° F. (e.g. 350-450 degrees F.). Any suitable powder top coat can be used.

Exemplary suitable topcoats include the POWDURA™ epoxy powder coatings, such as, for example, EAS60M056, and for higher temperatures, ERS8-700002 red oxide, both available from Sherwin Williams of Cleveland, Ohio.

Figure 3A:
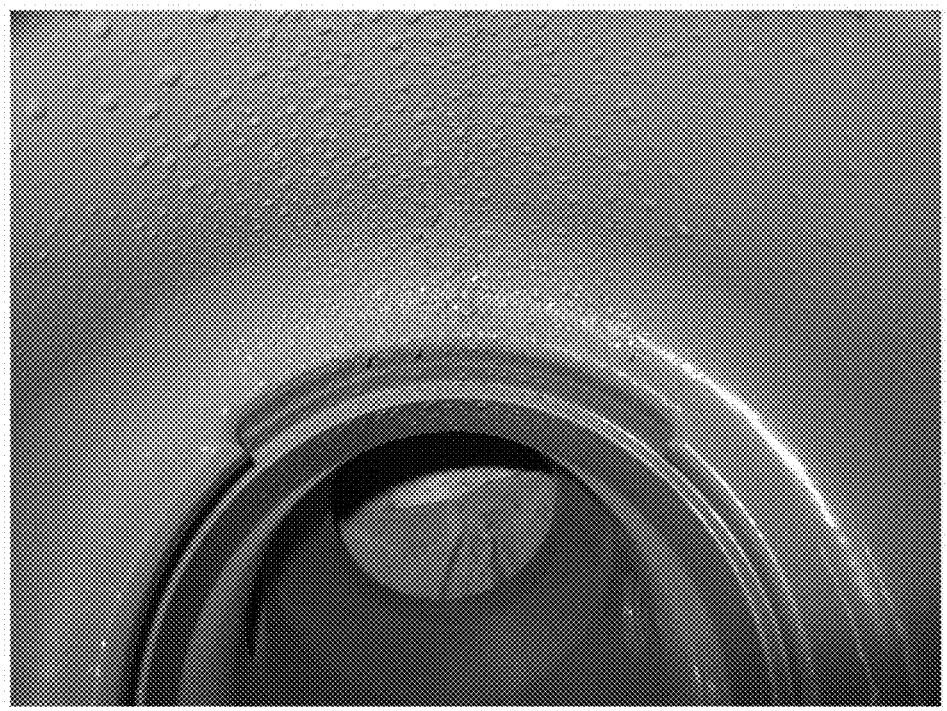
FIG. 3A is a drawing showing an exemplary component with a standard temperature top coat following high temperature testing which shows some blistering.
Figure 3B:
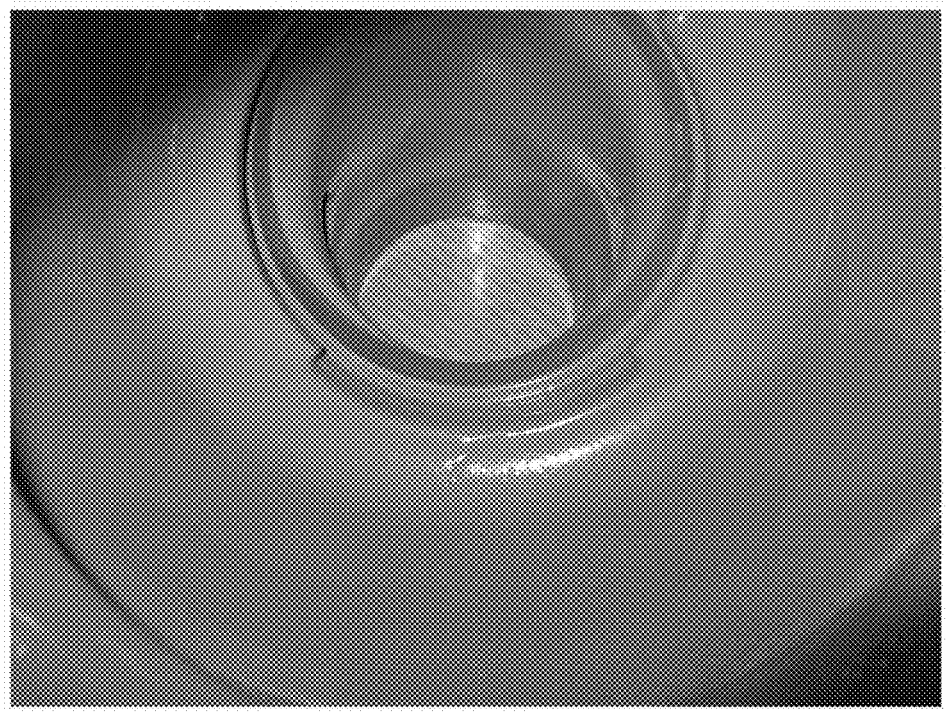
FIG. 3B is a drawing showing a similar exemplary component with a high temperature SW fusion bonded top coat which extends the new system and method of the Application to high temperature operation.

FIG. 3A is a drawing showing an exemplary component with a standard temperature top coat following testing at 175° F. for about 100 hours which shows some blistering. The test was well above the temperature rating of this top coat. FIG. 3B is a drawing showing an exemplary component with a high temperature SW fusion bonded top coat following testing at 175° F. for about 100 hours which extends the new system and method of the Application to such high temperature applications.

The cured valve assembly coating system of the Application significantly transforms the corrosion and microbial resistance of the substrate and provides an abrasion detecting barrier level. Damage in the topcoat can be visually detected as a color change at the damaged location because the topcoat is typically a different color than the primer. Additionally, the cured coating system can provide improved flow characteristics in valve waterways as the combination of the primer with encapsulated topcoat can smooth irregular surface finishes due to the ability to build cured coating thickness.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for coating a valve assembly comprising:
providing a valve assembly comprising a metal surface susceptible to corrosion;
cleaning an outside surface of said valve assembly;
adding an anti-microbial agent to a primer material comprising a zinc component to provide an anti-microbial zinc primer, the anti-microbial agent being different from the zinc component;
applying a first layer of said anti-microbial zinc primer to said outside surface of said valve assembly;
applying a second layer over the said first layer, said second layer consisting of an epoxy topcoat for a two-coat layer; and
curing said two-layer coat by heating said valve assembly.

2. The method of claim 1, wherein said step of providing comprises providing an iron metal.

3. The method of claim 1, wherein said step of providing comprises providing a steel metal.

4. The method of claim 1, wherein said step of cleaning comprises cleaning by shot blasting.

5. The method of claim 1, wherein said step of cleaning comprises pre-heating said outside surface of said valve assembly to about 250° F.

6. The method of claim 1, wherein said step of adding said anti-microbial agent comprising anti-microbial particles of about 5-8 microns.

7. The method of claim 1, further including preparing a primer gel comprising said anti-microbial zinc primer.

8. The method of claim 1, wherein said step of applying said first layer of said anti-microbial zinc primer to said outside surface of said valve assembly comprises applying said first layer by an electrostatic process at about 75 kV.

9. The method of claim 1, wherein said step of applying said second layer comprises applying a hybrid polyester powder topcoat.

10. The method of claim 1, wherein said step of applying said second layer over said first layer comprises applying said second layer by an electrostatic process at about 75 kV.

11. The method of claim 1, wherein said step of curing said two-layer coat by heating of said valve assembly comprises heating said valve assembly to about 400° F.

12. The method of claim 1, wherein said step of adding an anti-microbial agent comprises adding a solution comprising at least a quaternary ammonium compound to said primer material.

13. A method, comprising:
applying a primer layer to an exposed surface of a valve assembly, the exposed surface being disposed along a flow path through which a fluid traverses the valve assembly, the primer layer comprising a zinc component and at least one anti-microbial agent;
applying a second layer on the primer layer, said second layer consisting of an epoxy topcoat; and
curing at least the second layer,
wherein the at least one antimicrobial agent is different from the zinc component.

14. The method of claim 13, wherein the at least one anti-microbial agent comprises a quaternary ammonium compound.

15. The method of claim 14, wherein the at least one anti-microbial agent comprises an aqueous emulsion including the quaternary ammonium compound.

16. The method of claim 15, including forming the primer layer into a gel substance.

17. The method of claim 13, wherein applying a primer layer comprises depositing the primer layer on an exposed metallic surface of the valve assembly.

18. The method of claim 13, wherein applying the second layer consisting of an epoxy topcoat comprises at least partially covering the primer layer with an epoxy powder coating.

19. The method of claim 13, wherein applying the primer layer and the second layer provides a smooth coating on the exposed surface of the valve assembly to facilitate fluid flow along the flow path.

* * * * *